July 8, 1958

W. J. NIGHTINGALE 2,842,375

TORSION SPRING SUSPENSION FOR FRAME OF
CHILDREN'S VEHICLES

Filed Dec. 16, 1954

INVENTOR.
WILLIAM J. NIGHTINGALE
BY Edward W. Weikert

ATTORNEY

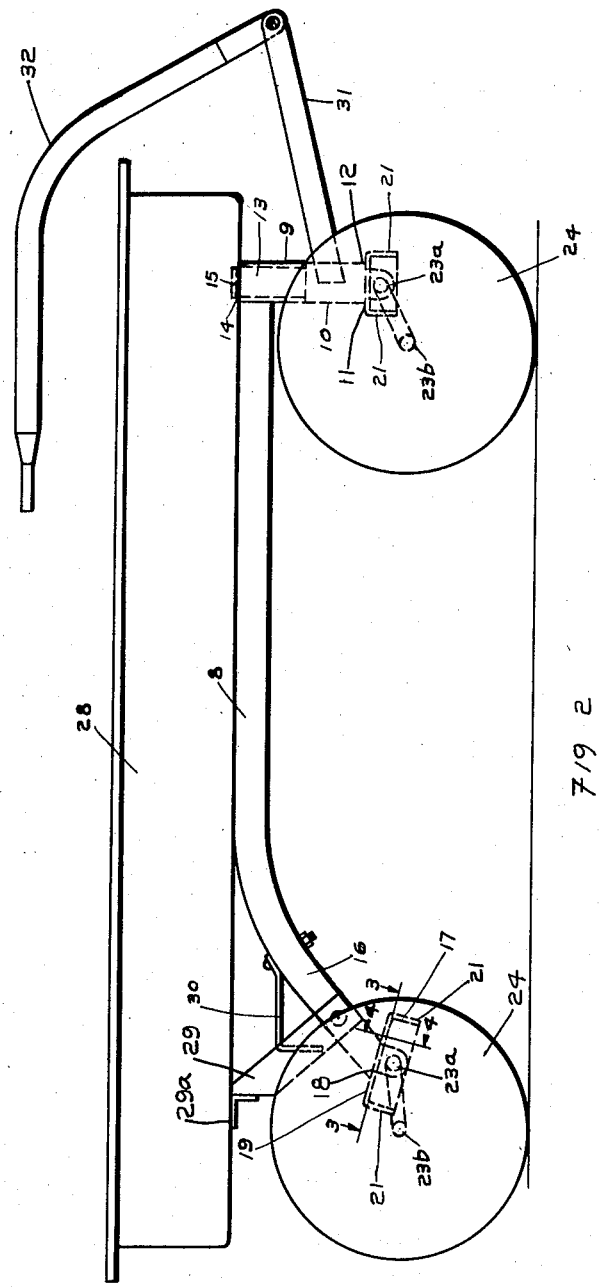

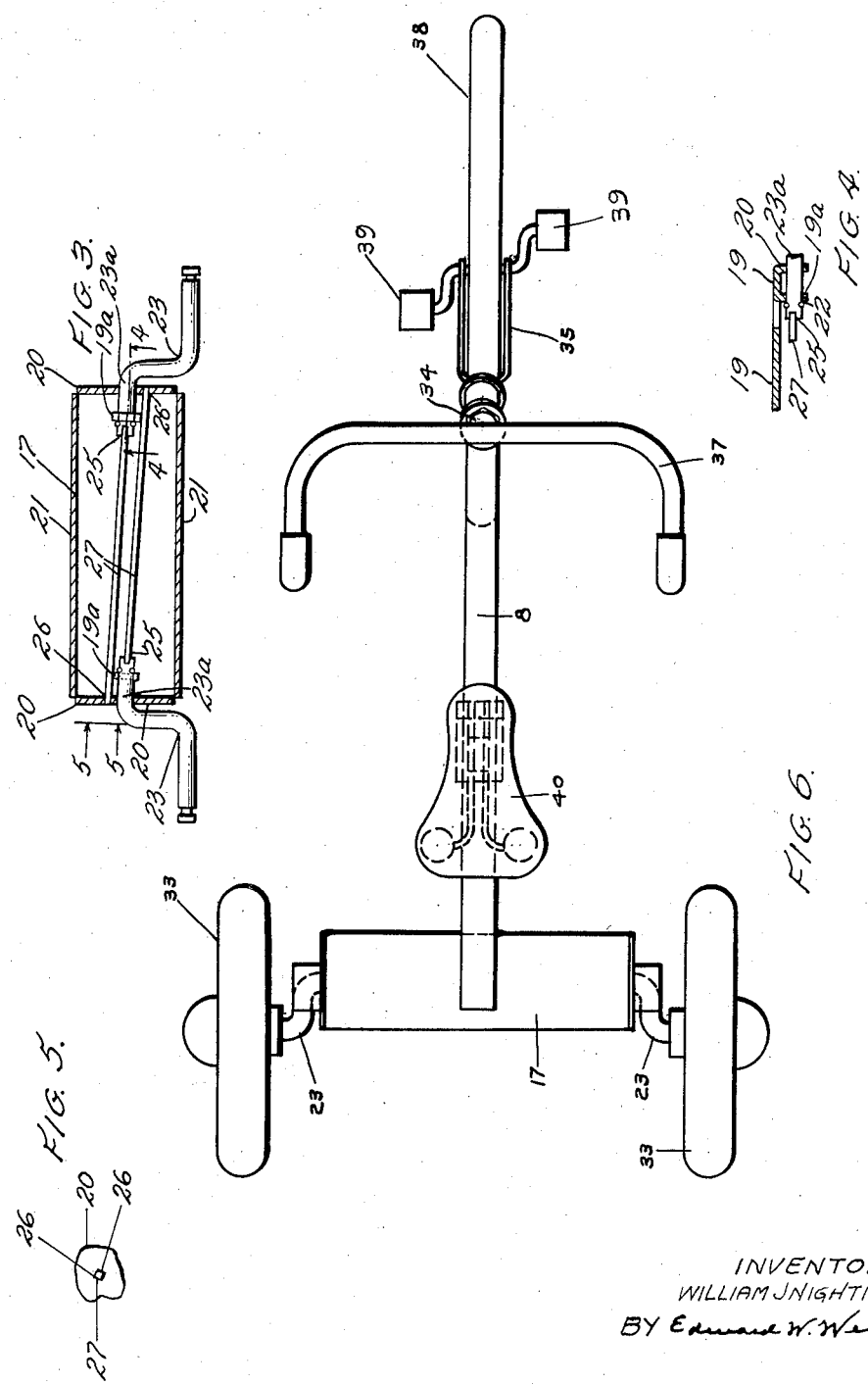

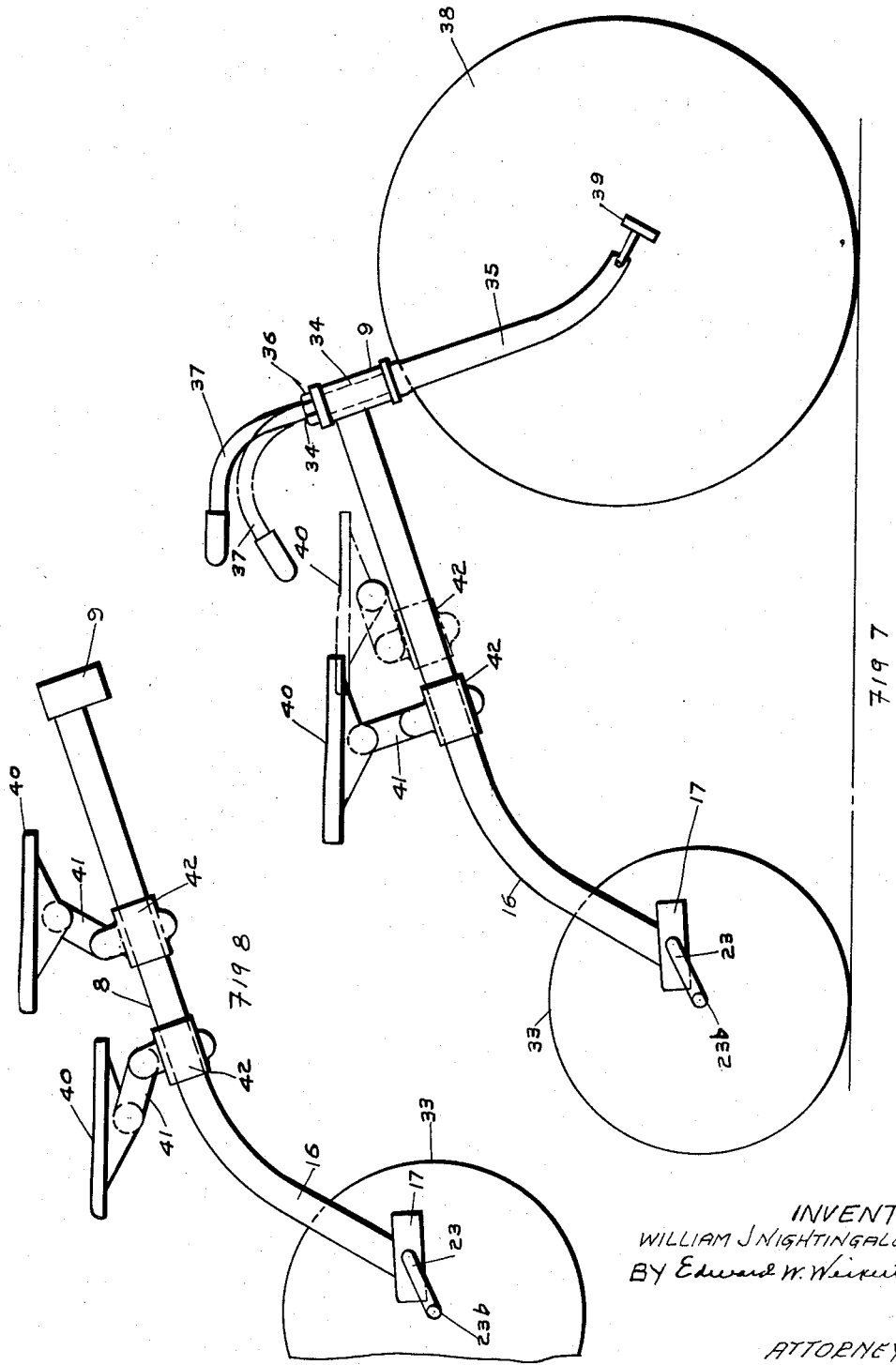

United States Patent Office 2,842,375
Patented July 8, 1958

2,842,375
TORSION SPRING SUSPENSION FOR FRAME OF CHILDREN'S VEHICLES

William J. Nightingale, Chicago, Ill., assignor of one-half to George C. Nightingale and one-half to Richard H. Nightingale Application December 16, 1954, Serial No. 475,699

6 Claims. (Cl. 280—87.03)

This invention relates to a torsion spring suspension for frame of children's vehicles and concerns itself primarily with a chassis having a longitudinally extending beam member with coupling means at its front end for attachment to a single or duplex rolling means and having a downwardly sloping rear end attached to a transverse torsion spring support adapted for attachment to duplex rolling means.

It is an object of this invention to provide a chassis for children's vehicles which can be universally used for either wagons, tricycles, hand cars or tractors or similar devices to overcome the costly expense of making separate dies for the different vehicles.

It is a further object of this invention to mount duplex wheels upon torsion springs in order to provide a more efficient and durable yield when the wheels travel over bumpy or uneven ground.

With these and other objects in view which will become apparent as the description proceeds, this invention comprises the novel structure and combinations of parts hereinafter described and more particularly pointed out and defined in the appended claims.

In the accompanying drawing which illustrates a preferred form of this invention and in which similar reference numerals refer to similar features in the different views:

Fig. 2 is a side elevation of the wagon,

Figure 1:
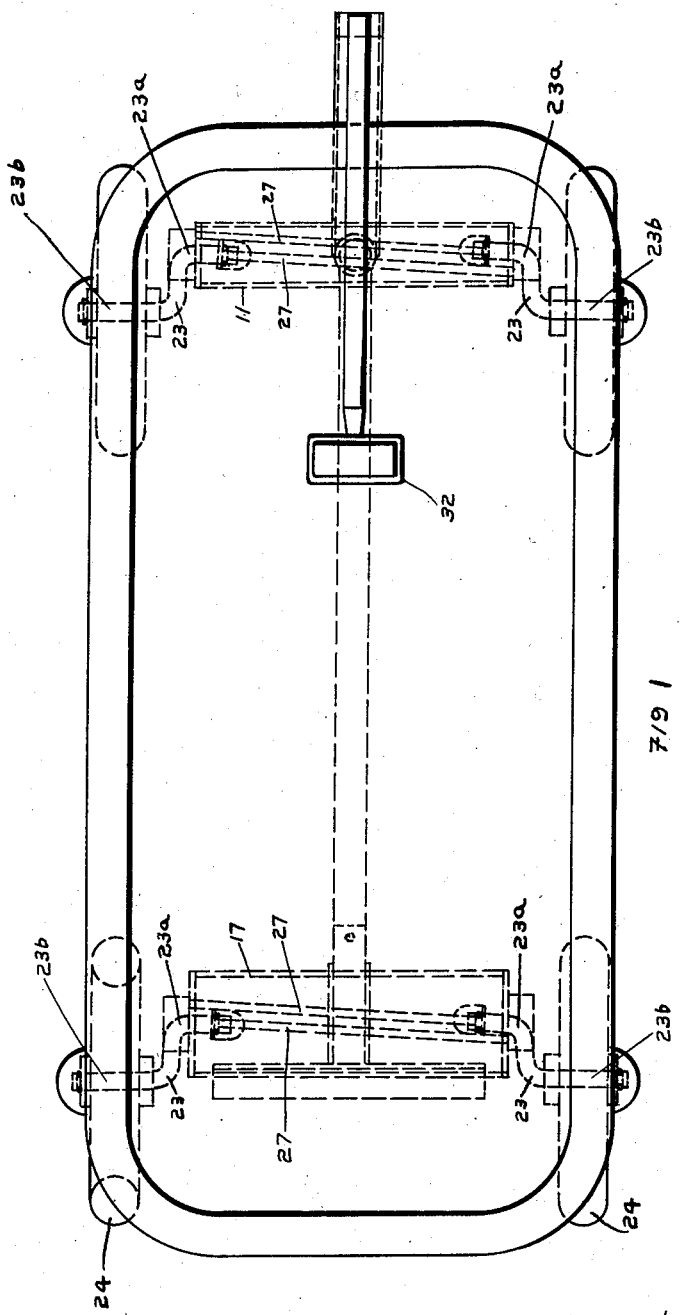
Fig. 1 is a top plan view of a child's wagon involving this invention.

Fig. 3 is an enlarged sectional view taken upon the line 3—3 of Fig. 2 looking in the direction of the arrows, Fig. 4 is an enlarged detail sectional view taken upon the line 4—4 of Fig. 2 looking in the direction of the arrows, Fig. 5 is a fragmentary elevational view taken upon the line 5—5 of Fig. 3, Fig. 6 is a top plan view of a tricycle having a chassis involving this invention, Fig. 7 is a side elevational view of the tricycle and Fig. 8 illustrates the manner of attaching the chassis to the forks of the tricycle.

In the present instance, the chassis is shown applied to a child's wagon with duplex rolling means at the front and rear and to a child's tricycle having duplex rolling means at the rear and single rolling means at the front, in order to show the universal character of the chassis.

In referring now to Figs. 1 to 5 of the drawing, there is shown a chassis comprising a longitudinally extending beam member 8 having a tubular coupling member 9 at its front end which is rigidly secured to the beam. This coupling member 9 is in registry with a coupling member 10 welded to a torsion spring support 11 as indicated at 12. A round plug or stud 13 is welded or secured in the coupling member 10 and extends thru the coupling member 9. The upper end of the plug 13 has a groove 14 for receiving a snap ring 15 for securing the couplings together.

The rear end of the beam member 8 has a downward curved slope 16 and the sloping end is welded or secured to a torsion spring support 17 as indicated at 18. This torsion spring support 17 is similar to the torsion spring support 11, except that it may be a little wider and at a different inclination, so only one torsion spring support need be described.

The torsion spring support has been illustrated in Figs. 2 to 5 and in referring to these figures, it will be seen that the support comprises an open casing at the bottom, having a top wall 19, end walls 20 and side walls 21. The top wall 19 has two cut out portions 19a, each spaced a short distance from an end wall 20, one of which is shown in Fig. 4. These cut-out portions 19a are bent down at right angles to the top 19 and are provided with apertures 22 for receiving the end portions of Z-shaped axle members 23 which extend thru apertures opposite end walls 20. Each of the two Z-shaped axle members shown has an arm 23a extending thru an end wall 20 and thru the bearing aperture 22 nearest the wall, the other arm 23b of each axle member serves as a journal for a wheel 24.

The inner end of each arm 23a of said Z-shaped axle members is provided with a rectangular socket 25 similar in shape and size to the rectangular apertures 26 in the end walls 20 shown in Fig. 5. A rectangular torsion spring 27 has one end anchored in an aperture 26 in one end wall and the other end extending into the rectangular socket 25 of the axle arm 23a extending thru the opposite wall 20. A second rectangular torsion spring 27 has one end anchored in the rectangular aperture 26 in said opposite wall with its other end extending into the rectangular socket 25 of the other axle arm 23a. It will be noted that one aperture 26 in an end wall 20 is located adjacent one side wall 21 while the other aperture 26 in the other end wall 20 is located adjacent the other side wall 21 and that each torsion spring is inclined toward the center line of the support; in other words, the torsion springs are inclined from their outer anchored ends toward the center line of the support 17 to clear the bearings 19a and the arms 23a. While the torsion springs are shown rectangular in cross section, it is conceivable that other cross sectional shapes may be used that will anchor the springs against rotation.

The front torsion spring support 11 is horizontal and supports the front wheels 24 and provides the same yield as the rear torsion spring support which is longitudinally inclined in a downward direction at its forward edge for providing the straight portion of beam 8 in a horizontal position.

A wagon body 28 is supported upon the chassis by means of a bracket 29 extending from an angle 29a on the bottom of the wagon and a strut 30 connecting the bracket with the beam 8. An arm 31 extends from the front end of the wagon to which it may be attached in any suitable manner. A swingable handle 32 is pivoted to the outer end of the arm for drawing the wagon. This handle may be swung over the front end of the wagon to store the same when not in use.

In Figs. 6, 7 and 8, the chassis is shown applied to a tricycle and it will be noted that the chassis is similar to the chassis 8 on the wagon in that it has a rear curved sloping portion 16 which is welded to a torsion spring support 17 so that the spring support 17 in inclined downwardly at its rear edge to provide a step for the rider when he mounts the tricycle, and allowing the beam 8 to be upwardly inclined toward the front end. The support 17 is mounted upon the rear wheels 33 in the manner described in connection with the rear wagon wheels. The beam 8 has a coupling member 9 upon its front end.

In the tricycle, the fork 35 on the front wheel 38 has a shank 34 which projects thru the coupling 9. A nut 36 upon the shank 34 binds the fork to the chassis. The shank 34 extends above the nut 36 for the attachment of the handle bar 37. The fork 35 is attached to the front wheel 38 in the usual manner and the wheel is equipped with the usual crank pedals 39.

The torsion spring support 17 contains the torsion bars 27 as in the wagon. The rear wheels 33 of the tricycle are mounted upon the axle members 23 as in the wagon. The action of the two are similar.

The chassis may be provided with one or more seats 40. In Fig. 7, a single seat 40 is shown mounted upon a link 41 pivoted to an adjustable collar 42 on the beam 8. By adjusting the collar 42, the seat can be shifted to the dotted line position shown in Fig. 7.

In Fig. 8, two seats are shown on the chassis and they can be adjusted as desired. In this figure, the chassis is shown attached to the rear wheels 33 of the tricycle and in position to be attached to the shank of the fork 35 by slipping the tubular coupling 9 over the shank 34 of the fork 35 and then completing the assembly.

It will now be apparent that the vehicle chassis is of a universal character is that the same chassis can be used in connection with wagons, tricycles and similar devices. In viewing Fig. 8, it will be noted that the rear sloping end of the beam member 8 has a downward curve with the result that it does not require the front end to be elevated to such an extent as to bring the coupling 9 unduly out of a vertical plane. If the beam member 8 were straight, and the front end were elevated for coupling relation with the fork, the beam would be at such an angle that the coupling 9 would be at such an angle to a vertical line that the coupling relation would be exceedingly difficult. As a result, the downward sloping curve 16 greatly facilitates the coupling relation.

It will be appreciated that this invention will materially reduce the cost and labor in constructing various types of children's vehicles and will provide a more efficient and durable yield for the duplex wheels in passing over uneven ground.

I am aware that many changes may be made and various details of construction may be modified without departing from the principles of this invention so I do not propose limiting the patent granted otherwise than necessitated by the appended claims.

I claim:

1. In a children's vehicle, a chassis comprising a central longitudinally extending beam member having a straight portion with a coupling means at its front end adapted for attachment to rolling means and having a downwardly sloping rear portion, a transverse torsion spring support on the rear end of said beam, said support having a top wall, end walls and side walls, said support having two torsion bars anchored against rotation at one end in opposite end walls and adapted for coupling relation at the other ends with Z-shaped axle members.

2. In a children's vehicle, a chassis comprising a longitudinally extending beam member having coupling means at its front end adapted for coupling relation with a support for rolling means, said beam having its rear portion downwardly inclined, a transverse torsion spring support on the rear end of said beam, said support having a top wall, end walls and side walls and an apertured bearing member spaced inwardly from each end wall, said end walls having axle receiving apertures in alinement with the apertures in said bearing members, opposed crank axles extending thru said end wall apertures and thru said bearing apertures and having sockets in their inner ends and two torsion bars, one having one end anchored against rotation in one end wall and the other end mounted against rotation in the socket of one axle and the other torsion bar having one end anchored against rotation in the other end wall and the other end thereof non-rotatably mounted in the socket of the other axle.

3. In a children's vehicle, a chassis comprising a longitudinally extending beam member having coupling means at its front end adapted for coupling relation with a support for rolling means, said beam having a downwardly inclined rear end portion, a transverse torsion spring support on the rear end of said beam, said support comprising a top wall, side walls and end walls, said top wall having a cut-out and downwardly bent bearing portion spaced a short distance from each end wall, each bearing portion having an axle receiving aperture and each end wall having an axle receiving aperture in horizontal alinement with the aperture in the adjacent bearing portion, a Z-shaped axle extending thru the aperture in one end wall and thru the aperture in the adjacent bearing portion, said axle having a rectangular socket in its inner end, a second Z-shaped axle extending thru the aperture in the other end wall and thru the aperture in the adjacent bearing portion and having a rectangular socket in its inner end, opposed rectangular torsion bars, one having an end anchored against rotation in one end wall and having its other end extending into the end socket of one axle and the other torsion bar having one end anchored against rotation in the other end wall and the other end extending into the socket of the other axle.

4. In a children's vehicle, a chassis comprising a longitudinally extending beam member having coupling means at its front end adapted for coupling relation with a support for rolling means and having a rear portion downwardly inclined, a torsion spring support on the rear end of said beam member, said support having two rectangular torsion bars with a terminal of each anchored therein against rotation, and a pair of Z-shaped wheel axles having portions extending into said support, each in coupling relation with one of said torsion bars and wheels journalled upon said axles.

5. In a children's vehicle, a chassis comprising a beam member having a straight portion with a coupling at its front end adapted for attachment to rolling means, said beam member having a downwardly sloping rear end portion, a transverse casing having a top wall attached to the rear end of said beam, said casing having side walls and end walls, said top wall having cut out and downwardly bent portions spaced short distances from the end walls, each bent portion having an axle receiving aperture and each end wall having an axle receiving aperture in alinement with the aperture in the adjacent bent portion, a Z-shaped axle extending thru the aperture in one end wall and the aperture in the adjacent bent portion and having a socket in its inner end, a second Z-shaped axle extending thru the aperture in the other end wall and the aperture in the adjacent bent portion and having a socket in its inner end, opposed torsion bar springs in said casing, one having an end enchored against rotation in one end wall and having its other end extending into the socket of one axle member and the other torsion spring having one end anchored against rotation in the other end wall and the other end extending into the socket of the second axle.

6. In an apparatus of the class described, a vehicle chassis comprising a beam member having a straight portion with a coupling means at its front end, a transverse casing having a vertical stud removably connected to said coupling means, torsion bars in said casing, wheel axles connected to said torsion bars, said beam member having a downwardly sloping rear end, a second transverse casing connected to the rear end of said beam member, torsion bars in said second casing, wheel axles connected to said second mentioned torsion bars and a wagon body supported upon the straight portion of said beam member.

References Cited in the file of this patent

UNITED STATES PATENTS

| 1,778,116 | Marqua | Oct. 14, 1930 |
| 2,169,373 | Porsche | Aug. 15, 1939 |
| 2,338,730 | Morgan et al. | Jan. 11, 1944 |
| 2,497,072 | Cooper | Feb. 14, 1950 |
| 2,516,705 | Kraeft et al. | July 25, 1950 |